United States Patent
Siegel et al.

(10) Patent No.: US 7,020,761 B2
(45) Date of Patent: Mar. 28, 2006

(54) BLOCKING PROCESSING RESTRICTIONS BASED ON PAGE INDICES

(75) Inventors: Timothy J. Siegel, Staatsburg, NY (US); Bruce A. Wagar, Hopewell Junction, NY (US); Ute Gaertner, Schoenaich (DE); Lisa C. Heller, Rhinebeck, NY (US); Erwin F. Pfeffer, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 10/436,209

(22) Filed: May 12, 2003

(65) Prior Publication Data

US 2004/0230768 A1  Nov. 18, 2004

(51) Int. Cl.
*G06F 12/00* (2006.01)

(52) U.S. Cl. .................. 711/202; 711/204; 711/206; 711/210; 712/16

(58) Field of Classification Search ................ 711/202, 711/200, 204, 206; 712/16
See application file for complete search history.

(56) References Cited

U.S. PATENT DOCUMENTS

| | | | | |
|---|---|---|---|---|
| 5,530,891 A | * | 6/1996 | Gephardt ....................... 710/8 |
| 5,555,430 A | * | 9/1996 | Gephardt et al. ............. 712/16 |
| 5,564,060 A | * | 10/1996 | Mahalingaiah et al. ........ 710/51 |
| 5,568,649 A | * | 10/1996 | MacDonald et al. .......... 710/48 |
| 5,613,126 A | * | 3/1997 | Schmidt ...................... 710/260 |
| 5,761,734 A | | 6/1998 | Pfeffer et al. ................ 711/164 |
| 5,781,187 A | * | 7/1998 | Gephardt et al. ........... 710/309 |
| 6,079,013 A | | 6/2000 | Webb et al. ................. 712/227 |
| 6,119,219 A | | 9/2000 | Webb et al. ................. 712/227 |

OTHER PUBLICATIONS

"z/Architecture Principles of Operation," IBM Publication No. SA22-7832-00, Dec. 2000, Chapter 3, pp. 9-10 and 27-49; Chapter 10, pp. 18-19, 29-30 and 91.

* cited by examiner

*Primary Examiner*—Mano Padmanabhan
*Assistant Examiner*—Mehdi Namazi
(74) *Attorney, Agent, or Firm*—Lynn L. Augspurger, Esq.; Blanche E. Schiller, Esq.; Heslin Rothenberg Farley & Mesiti P.C.

(57) ABSTRACT

Processing restrictions of a computing environment are filtered and blocked, in certain circumstances, such that processing continues despite the restrictions. One restriction includes an indication that address translation is prohibited, in response to a buffer miss. When a processing unit of the computing environment is met with this restriction, it performs a comparison of page indices, which indicates whether the address translation can continue. If address translation can continue, the restriction is ignored. The processing unit includes a processor or a pageable entity, as examples.

59 Claims, 9 Drawing Sheets

BLOCKING PROCESSING RESTRICTIONS BASED ON PAGE INDICES

CROSS-REFERENCE TO RELATED APPLICATIONS

This application contains subject matter which is related to the subject matter of the following applications, each of which is assigned to the same assignee as this application. Each of the below listed applications is hereby incorporated herein by reference in its entirety:

"FILTERING PROCESSOR REQUESTS BASED ON IDENTIFIERS," Slegel et al., Ser. No. 10/436,361, filed herewith;

"BLOCKING PROCESSING RESTRICTIONS BASED ON ADDRESSES," Slegel et al., Ser. No. 10/435,361, filed herewith; and "INVALIDATING STORAGE, CLEARING BUFFER ENTRIES, AND AN INSTRUCTION THEREFOR," Slegel et al., Ser. No. 10/435,919, filed herewith.

TECHNICAL FIELD

This invention relates, in general, to processing within a computing environment, and in particular, to blocking processing restrictions of the computing environment, such that processing can continue despite the restrictions.

BACKGROUND OF THE INVENTION

The processing of a request by one processor of a computing environment may affect one or more other processors of the environment. For example, in a Symmetric Multiprocessor System (SMP) based on the z/Architecture of International Business Machines Corporation, Armonk, N.Y., a broadcast purge operation, such as an Invalidate Page Table Entry (IPTE) instruction, requires entries of one or more buffers (e.g., Translation Lookaside Buffers (TLBs)) to be removed from the buffers in all processors of the environment. Furthermore, the architecture requires the buffers to be purged atomically, such that no processor can observe a new TLB entry, while some other processor observes an old entry. Many other computer architectures also provide a similar mechanism.

One common implementation for the broadcast purge operation includes the following: 1) all processors are quiesced (i.e., most normal processing operations are suspended, including accessing the TLB); 2) TLBs on all processors are purged of the appropriate entries; 3) the common resource is changed (e.g., a page table entry in storage for IPTE); and 4) finally, the quiesce is released and the processors continue their normal activities. Obviously, this implementation could have a major performance impact, especially for large SMP configurations, since all processors must be quiesced for the duration of the operation. In particular, it is common that one processor is executing some long running instruction that is not interruptible, so it cannot reach the quiesce state for some time. Thus, all other processors are required to wait for this last processor to reach the quiesce state before the steps described above can be completed.

Some strides have been made in the above processing to enhance performance. For example, in U.S. Pat. No. 6,119,219, entitled "System Serialization With Early Release Of Individual Processor," Webb et al., Sep. 12, 2000, and U.S. Pat. No. 6,079,013, entitled "Multiprocessor Serialization With Early Release of Processors," Webb et al., Jun. 20, 2000, each of which is hereby incorporated herein by reference in its entirety, a technique is described in which processors are potentially quiesced for a shorter period of time. For example, when a processor receives a request, it immediately quiesces and then purges the appropriate entries in its own TLB. After the purge is complete, this processor is allowed to continue processing subject to various restrictions. One of these restrictions includes that if the processor misses in its TLB, it is not permitted to perform address translation, but instead must stall until the quiesce is released. Only after the quiesce is released are all restrictions removed from the processors and processing can continue.

Thus, although attempts have been made to reduce the amount of time processors are stalled, enhancements are still needed. For example, a need exists for a capability that enables processing restrictions to be blocked, such that processing can continue, despite the restrictions.

SUMMARY OF THE INVENTION

The shortcomings of the prior art are overcome and additional advantages are provided through the provision of a method of facilitating processing of a computing environment. The method includes, for instance, determining whether address translation is to continue despite a restriction prohibiting address translation; and continuing with processing, in response to the determining.

In a further aspect of the present invention, a method of facilitating processing of a computing environment is provided. The method includes, for instance, obtaining, by a processing unit of the computing environment, an indication to stall processing, in response to a processing restriction; determining whether the processing restriction is to be blocked; and continuing processing, in response to the determining.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided that enables processing within a computing environment to continue, despite a processing restriction indicating that processing is prohibited. As one example, address translation is allowed to be performed, subsequent to a buffer miss, although it is indicated as prohibited. A comparison of page indices, for instance, indicates whether the prohibition can be blocked.

Figure 1:
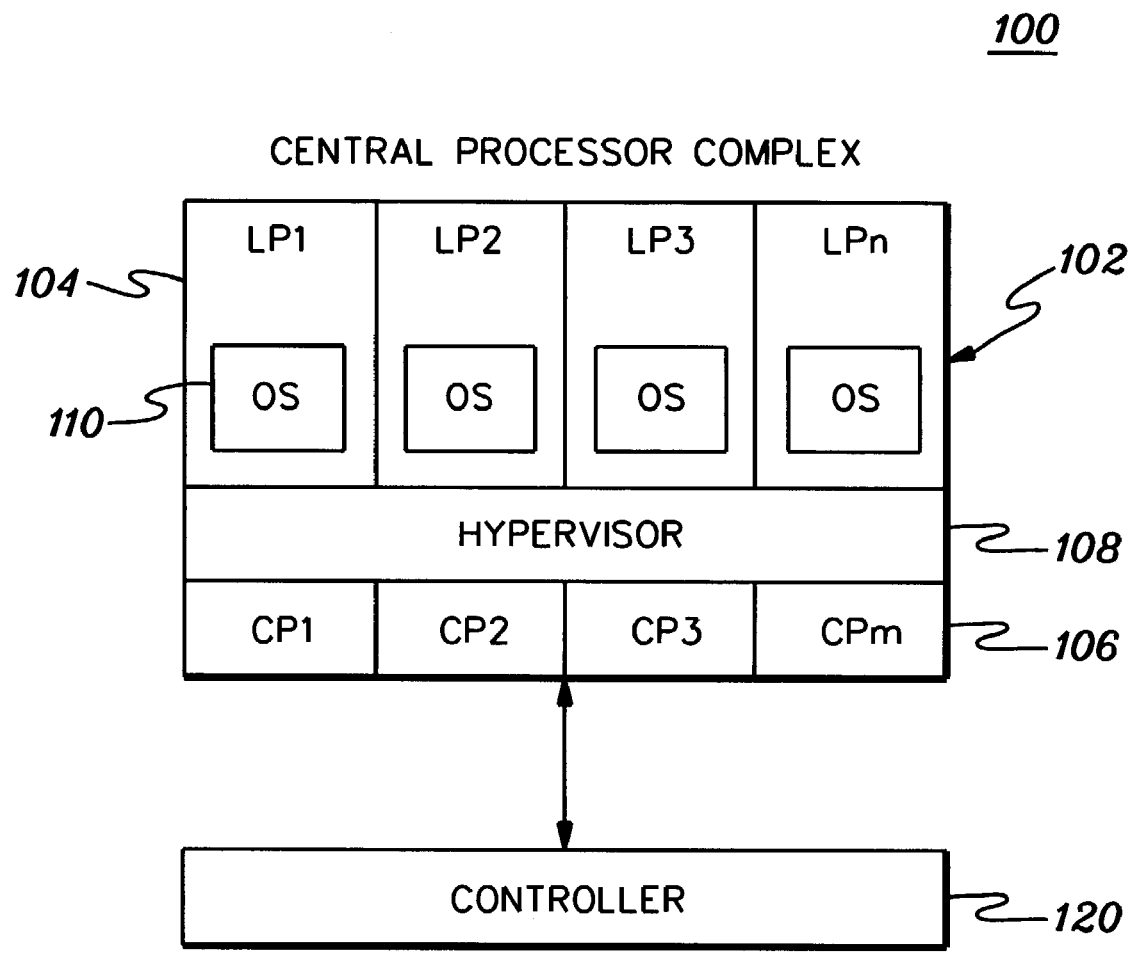
FIG. 1 depicts one embodiment of a computing environment incorporating and using one or more aspects of the present invention.

One embodiment of a computing environment 100 incorporating and using one or more aspects of the present invention is described with reference to FIG. 1. Computing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-00, December 2000, which is hereby incorporated herein by reference in its entirety. (IBM® is a registered trademark of International Business Machines Corporation, Armonk, N.Y., U.S.A. Other names used herein may be registered trademarks, trademarks or product names of International Business Machines Corporation or other companies.) In one example, a computing environment based on the z/Architecture includes an eServer zSeries offered by International Business Machines Corporation, Armonk, N.Y.

As one example, computing environment 100 includes a central processor complex (CPC) 102 coupled to a controller 120. Central processor complex 102 includes, for instance, one or more partitions 104 (e.g., logical partitions LP1–LPn), one or more central processors 106 (e.g., CP1–CPm), and a hypervisor 108 (e.g., a logical partition manager), each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete computer system, but in reality, only a portion of it is available. A combination of hardware and Licensed Internal Code (commonly referred to as microcode) keeps a program in a logical partition from interfering with a program in a different logical partition. This allows several different logical partitions to operate on a single physical processor in a time sliced manner. In this particular example, each logical partition has a resident operating system 110, which may differ for one or more logical partitions. In one embodiment, operating system 110 is the z/OS operating system offered by International Business Machines Corporation, Armonk, N.Y.

Central processors 106 are physical processor resources that are allocated to the logical partitions. For instance, a logical partition 104 includes one or more logical processors, each of which represents all or a share of a physical processor resource 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors. One example of hypervisor 108 is the Processor Resource/Systems Manager (PR/SM), offered by International Business Machines Corporation, Armonk, N.Y.

Controller 120, which is coupled to the central processor complex, includes centralized logic responsible for arbitrating between different processors issuing requests. For instance, when controller 120 receives a request, it determines that the requester is the master processor for that request and that the other processors are slave processors; it broadcasts messages; and otherwise, handles requests. One example of a controller is described in U.S. Pat. No. 6,199,219, entitled "System Serialization With Early Release Of Individual Processor," Webb et al., Sep. 12, 2000, which is hereby incorporated herein by reference in its entirety. Further details are also described with reference to FIG. 2.

Figure 2:
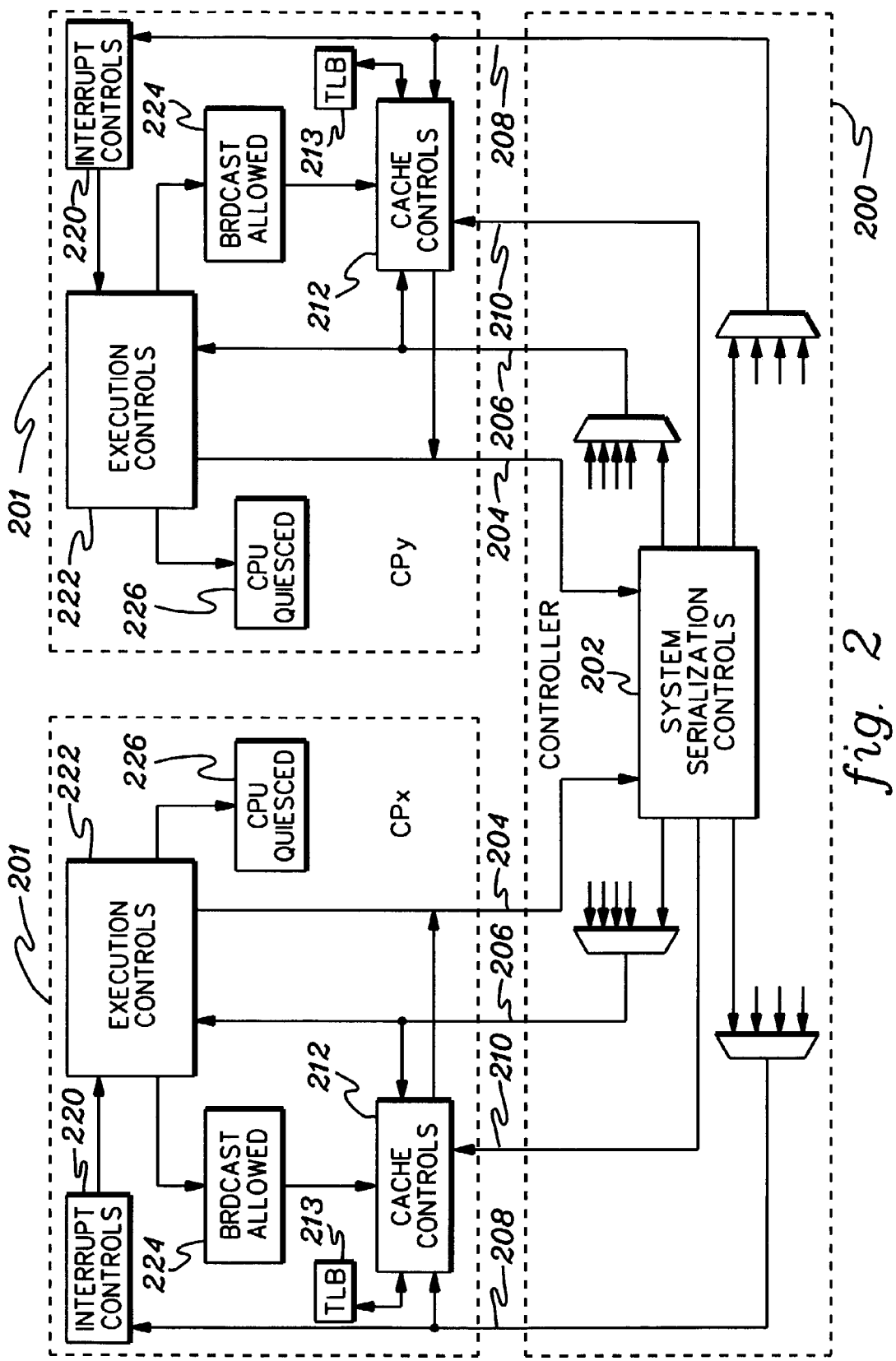
FIG. 2 depicts one embodiment of further details associated with a controller of FIG. 1, in accordance with an aspect of the present invention.

FIG. 2 depicts one example of a controller 200 coupled to a plurality of central processors (CPUs) 201. In this example, only two central processors are depicted. However, it will be understood that more than two processors may be coupled to controller 200.

Controller 200 includes various controls including, for instance, system serialization controls 202. The system serialization controls are used to insure that operations that are to be serialized, such as Invalidate Page Table Entry (IPTE) instructions, are serialized, in that only one such instruction is in progress at one time in the computing environment. It also monitors the sequence of events for that operation.

Controller 200 is coupled to each central processor via various interfaces. For instance, an interface 204 is used by the Licensed Internal Code in a central processor to send "control" commands to the controller, which specify an action to be taken, and to send "sense" commands, which return information from the controller. Another interface is a response bus 206, which is used to return information from the controller for the "sense" commands. The response bus is also used to communicate command status for "control" commands, and may be set from a plurality of sources within the controller, including the system serialization controls. A central processor can use this interface to sense the state of the system serialization controls in controller 200.

A further interface is interface 208, which is used by the controller to send commands to each CPU. This may also be controlled from a plurality of sources within the controller, including system serialization controls 202. A yet further interface is interface 210, which provides signals to cache controls 212 of central processor 201. Cache controls 212 process commands, in response to the signals. In one example, cache controls 212 process commands that affect one or more buffers, such as Translation Lookaside Buffers (TLBs) 213, as described in further detail below.

In addition to cache controls 212, central processor 201 includes various other controls, including, for instance, interrupt controls 220 and execution controls 222. In response to particular events, interrupt controls 220 cause an internal interruption to be pending in the CPU, which in turn, causes execution controls 222 to suspend program instruction processing, at the next interruptible point. In response to the interruption, execution controls 222 invokes a Licensed Internal Code routine to set a broadcast operation allowed latch 224 to enable cache controls 212 to process pending commands.

Central processor 201 also includes a CPU quiesced latch 226 that indicates whether or not the central processor is quiesced.

The above described computing environment is only one example. Many variations are possible without departing from the spirit of the present invention. For example, one or more partitions can be running in different architecture modes. Further, as one example, the environment need not be based on the z/Architecture, but instead, can be based on other architectures offered by Intel, Sun Microsystems, as well as others. Moreover, an environment may include an emulator (e.g., software or other emulation mechanisms), in which a particular architecture or a subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

Individual processors execute instructions, as well as handle other processing. At times, the processing of a particular instruction places processing restrictions on the processing of one or more other processors of the computing environment. There are situations, however, when those restrictions may be ignored, in accordance with an aspect of the present invention. Thus, a processor may filter a processing restriction, and block (i.e., ignore) that restriction, in certain circumstances. This is described in further detail below.

One example described herein relates to the execution of an Invalidate Page Table Entry (IPTE) instruction. An instance of an Invalidate Page Table Entry instruction is described in an IBM® publication entitled, "z/Architecture Principles of Operation," IBM Publication No. SA22-7832-00, December 2000, which is hereby incorporated herein by reference in its entirety.

The Invalidate Page Table Entry instruction causes one or more processors to purge entries in a buffer relating to the instruction. For instance, each processor has associated therewith one or more buffers, referred to as Translation Lookaside Buffers (TLBs), located in the processor. The Translation Lookaside Buffers are used by a Dynamic Address Translation (DAT) mechanism to enhance performance, when translating virtual addresses to real addresses. That is, some of the information used by the Dynamic Address Translation mechanism is maintained in the buffers for faster access. For example, various information specified in region tables, segment tables and/or page tables are maintained in the buffers.

To purge an entry in a buffer, processors within the environment are placed in a quiesce state, such that data is not corrupted. While in this quiesce state, restrictions are placed on those processors, indicating, for instance, that address translation cannot be performed, if there is a miss in their TLB. However, in accordance with an aspect of the present invention, this restriction can be filtered and ignored, such that processing may continue. This is described in further detail with reference to FIGS. 3–9. In particular, FIG. 3 depicts one embodiment of the logic associated with an aspect of the present invention, and FIGS. 4–9 provide further details for one particular example, in which an IPTE instruction is executed.

Figure 3:
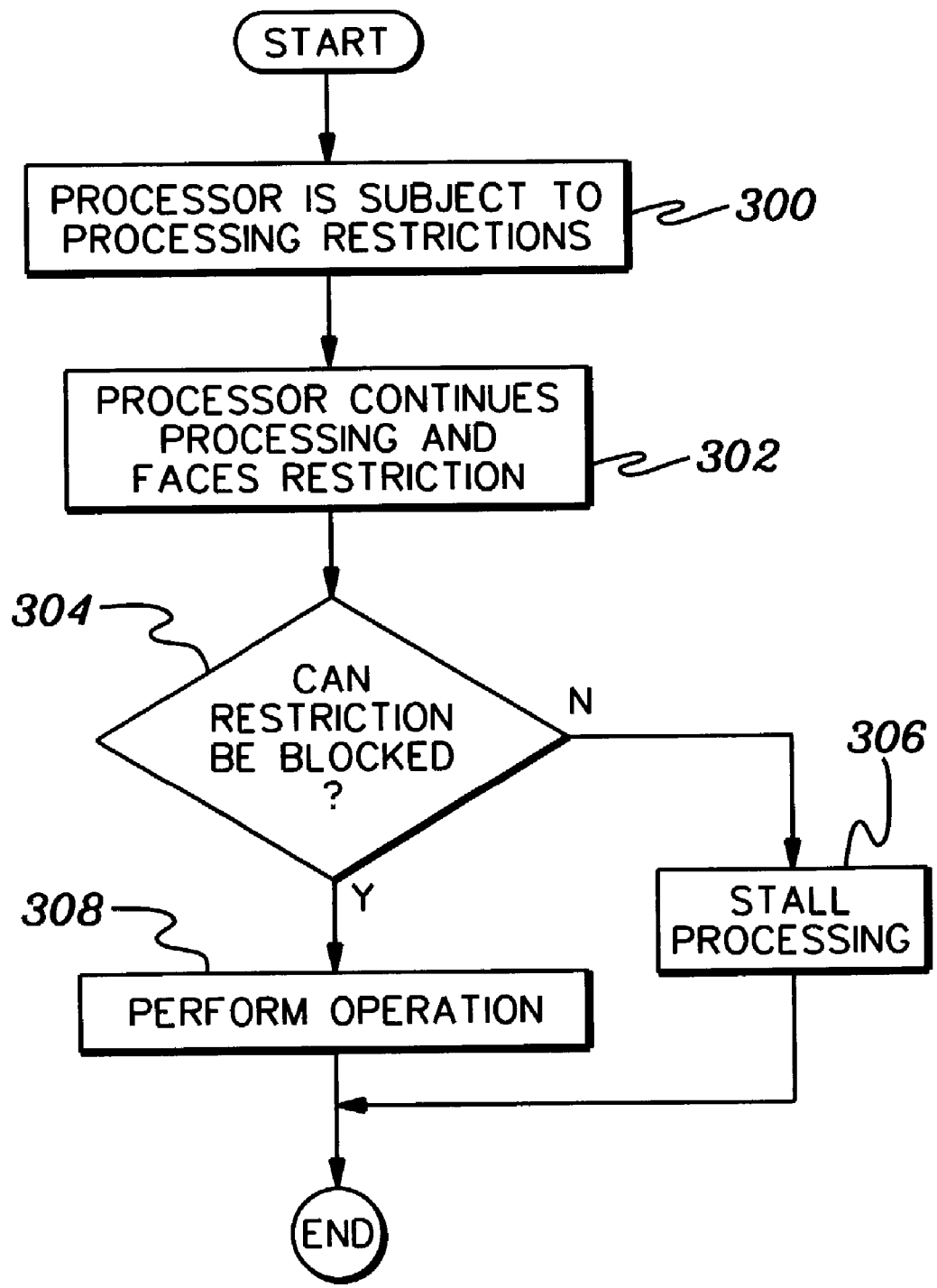
FIG. 3 depicts one embodiment of the logic associated with determining whether an operation is to be performed regardless of a restriction placed thereon, in accordance with an aspect of the present invention.

Initially, referring to FIG. 3, a processor executing within a computing environment becomes subject to processing restrictions, STEP 300. In one example, this occurs when the processor is placed in a quiesce state. In response to being placed in a quiesce state, the processor continues processing under certain restrictions. For example, the processor is to stall processing, if the processor misses in one or more of its TLBs.

The processor continues processing until it is faced with the restriction, STEP 302. For example, it continues processing until it misses in its TLB. Then, in accordance with an aspect of the present invention, a determination is made as to whether the processor can continue with the operation, despite the restriction, INQUIRY 304. That is, a decision is made as to whether the restriction can be blocked. In one example, this determination is made based on page indices. For instance, a comparison is made between a page index that is to be used for translation (e.g., address translation) and a page index previously saved by the processor. If the indices are equal, then processing is stalled, STEP 306. However, if the indices are unequal, then the operation can be performed, despite the restriction, STEP 308.

Figure 4:
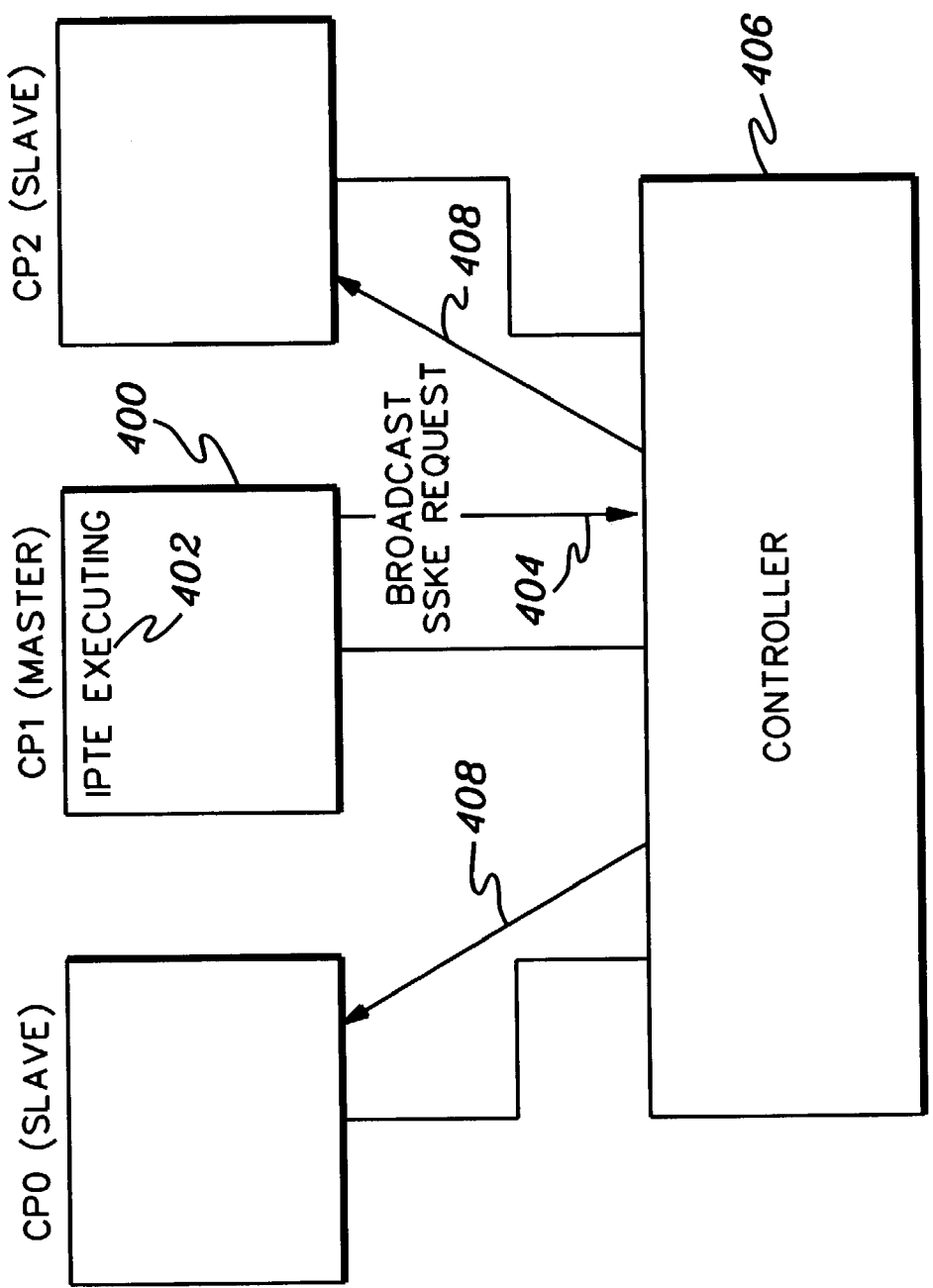
FIG. 4 pictorially depicts one example of a master processor executing an Invalidate Page Table Entry (IPTE) instruction and issuing a broadcast request to a controller, which then forwards the request to slave processors, in accordance with an aspect of the present invention.

Further details relating to the processing of one or more aspects of the present invention are described with reference to FIGS. 4–9. Although three processors are depicted, it is understood that any numbers of processors can be used. Referring to FIG. 4, a processor 400 executing an instruction 402 (e.g., an IPTE instruction) issues a broadcast request 404 (e.g., a quiesce request) as part of processing the instruction. The request is forwarded, in this example, to a controller 406. The processor issuing the request is referred to herein as the master processor, and the other processors are referred to as slave processors. The processors are coupled to controller 406.

In response to controller 406 receiving a request of a broadcast nature from the master processor, the controller forwards the request (408) to the slave processors. The processors process the request in an appropriate manner, which depends on, for example, the current state of the processors.

Figure 5:
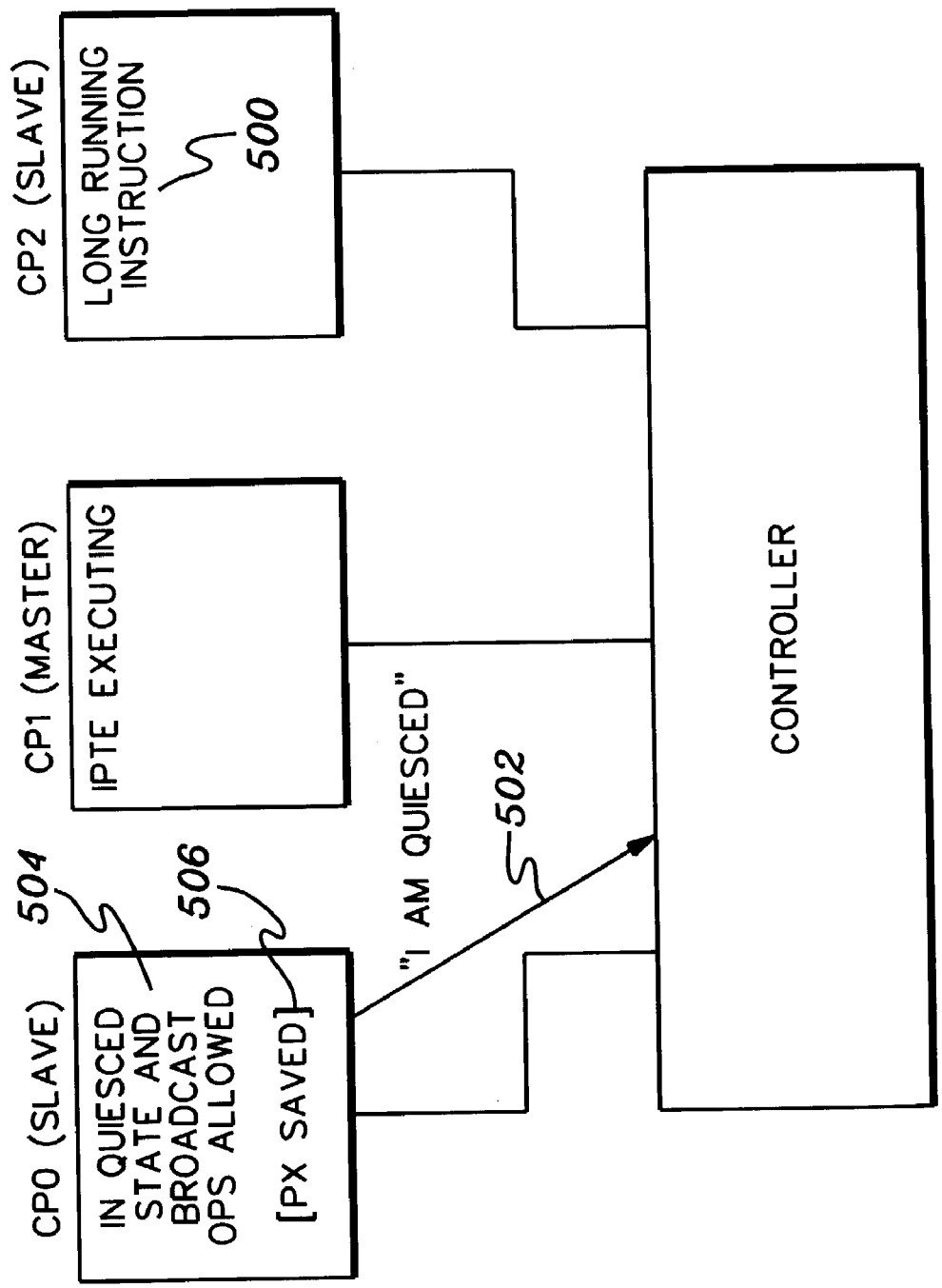
FIG. 5 pictorially depicts one example of a slave processor responding to the request sent by the controller of FIG. 4, in accordance with an aspect of the present invention.

For example, as depicted in FIG. 5, CP2 is executing a long running instruction (500), and thus, does not respond to the quiesce request at this time and the quiesce request remains pending for CP2. On the other hand, CP0 responds to the controller that has reached a quiesce point (502), and it performs an operation associated with the quiesce request. This operation includes purging entries from one or more of its TLBs (504). Additionally, in accordance with an aspect of the present invention, CP0 saves at least a portion of the page index of the request for later use (506). In one example, a page index is an offset of a given page table entry from the origin of the page table, and 4–6 bits of the page index are saved. However, in other examples, other numbers of bits, including the entire page index, may be saved.

Figure 6:
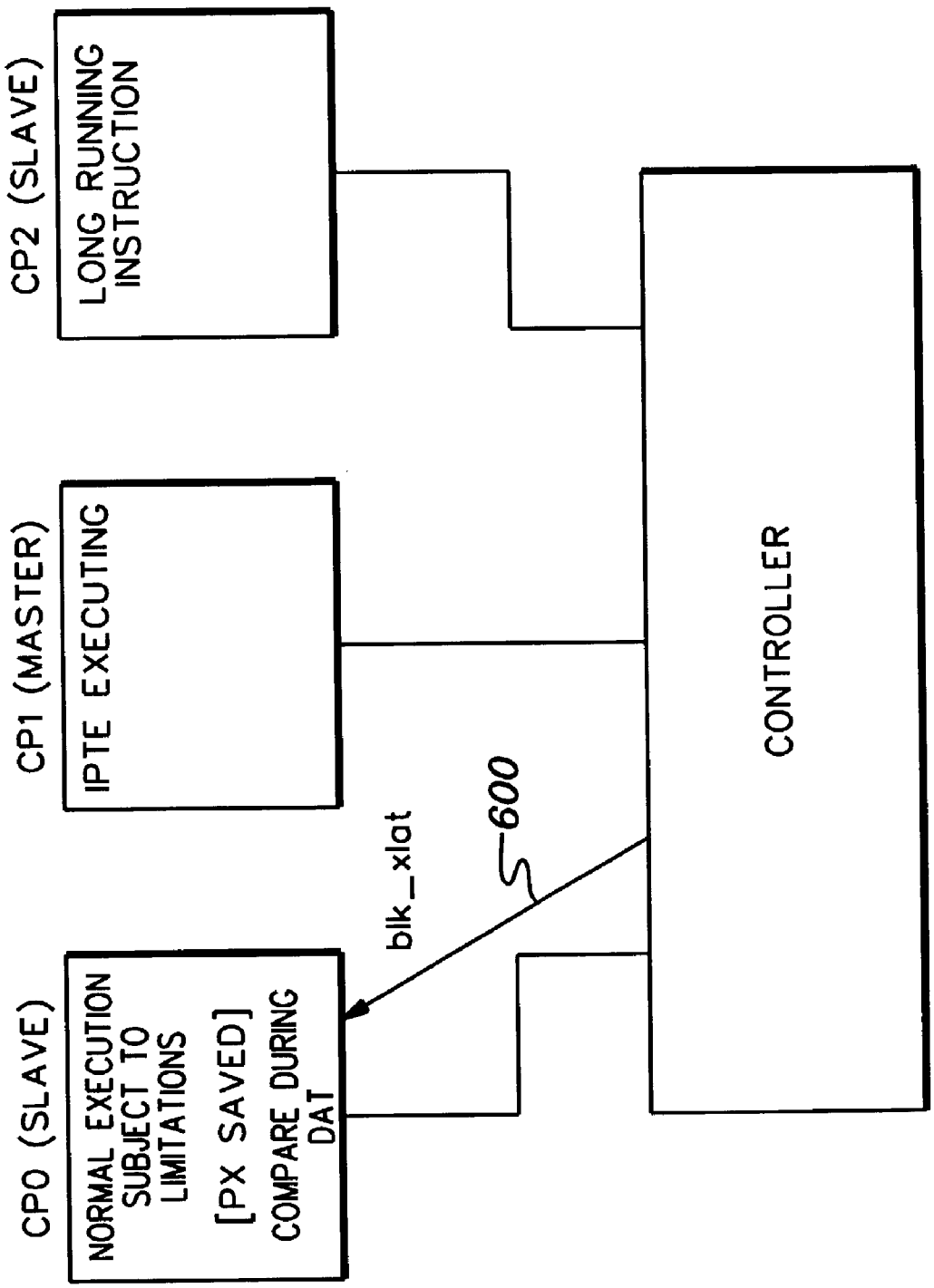
FIG. 6 pictorially depicts one example of a processing restriction being placed on a slave processor and processing associated therewith, in accordance with an aspect of the present invention.

Since CP0 indicated to the controller that it has reached a quiesce point, in one embodiment, the controller sets a signal for the processor (see FIG. 6). This signal is, for instance, a block translations (blk_xlat) signal (600) indicating that the slave processor is not permitted to continue in the event of a TLB miss. That is, the slave processor is signaled that it is not permitted to perform DAT translations in the event of a TLB miss. However, in accordance with an aspect of the present invention, further processing is performed to determine if the signal can be ignored.

For example, when CP0 misses in its TLB (e.g., there is no entry in the TLB corresponding to the virtual address to be translated), it attempts to perform Dynamic Address Translation. During Dynamic Address Translation, it compares at least a portion of the page index of the page it is to access with the saved page index it has from the broadcast IPTE operation. If they do not match, then the processor is allowed to continue translation and resume normal execution. For example, the processor can continue using parts of the virtual address and/or other information to index into tables to obtain information usable in forming the real address. Further, as part of normal execution, the processor completes this instruction, as well as processes other instructions.

However, if they do match, then the processor stalls and waits for the blk_xlat signal to drop. (In one example, comparisons are performed at one or more steps during the translation, and processing continues or stalls, in response to the comparisons.)

Figure 7:
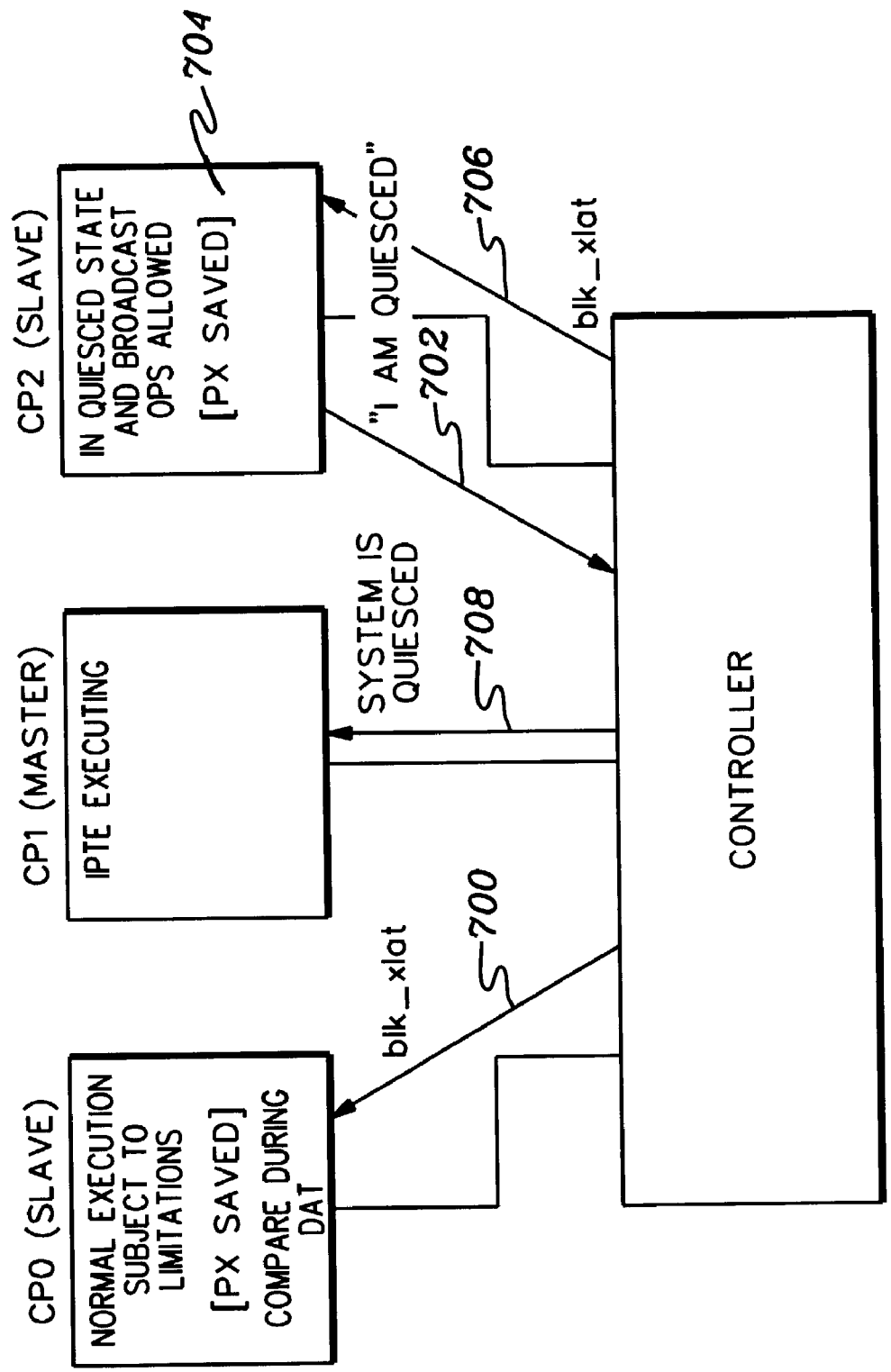
FIG. 7 pictorially depicts one example of further processing being performed by the processors in relation to the Invalidate Page Table Entry instruction, in accordance with an aspect of the present invention.

With reference to FIG. 7, it is shown that CP0 is continuing to execute instructions under the restrictions described above. These restrictions continue until the blk_xlat signal (700) drops. Further, it is shown that CP2 has finally finished its long running instruction and is able to take the quiesce interrupt. Thus, CP2 responds back to the controller that it is at a quiesce point (702). Further, it purges its TLB of appropriate entries associated with the broadcast IPTE operation and saves at least a portion of the page index for later use (704).

In response to the controller receiving the quiesce indication from CP2, the controller sets the blk_xlat signal for CP2 (706), and CP2 is now under the same restrictions that CP0 has been under. Additionally, the controller responds to the quiesce master processor, CP1, that the last processor in the system has reached the quiesce point, and the system is placed in a quiesce state (708).

Figure 8:
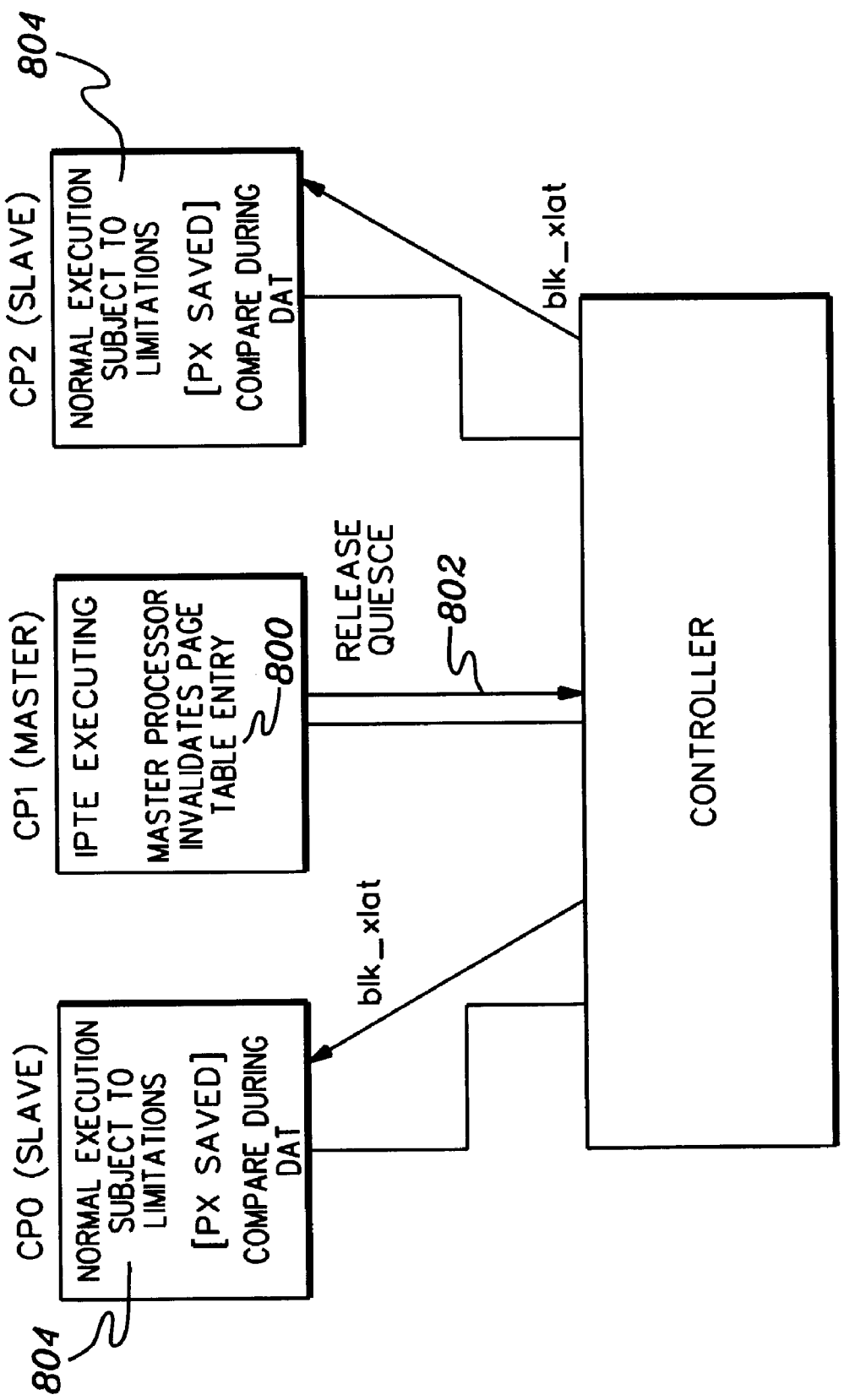
FIG. 8 pictorially depicts the master processor sending a release quiesce request to the controller, in accordance with an aspect of the present invention.
Figure 9:
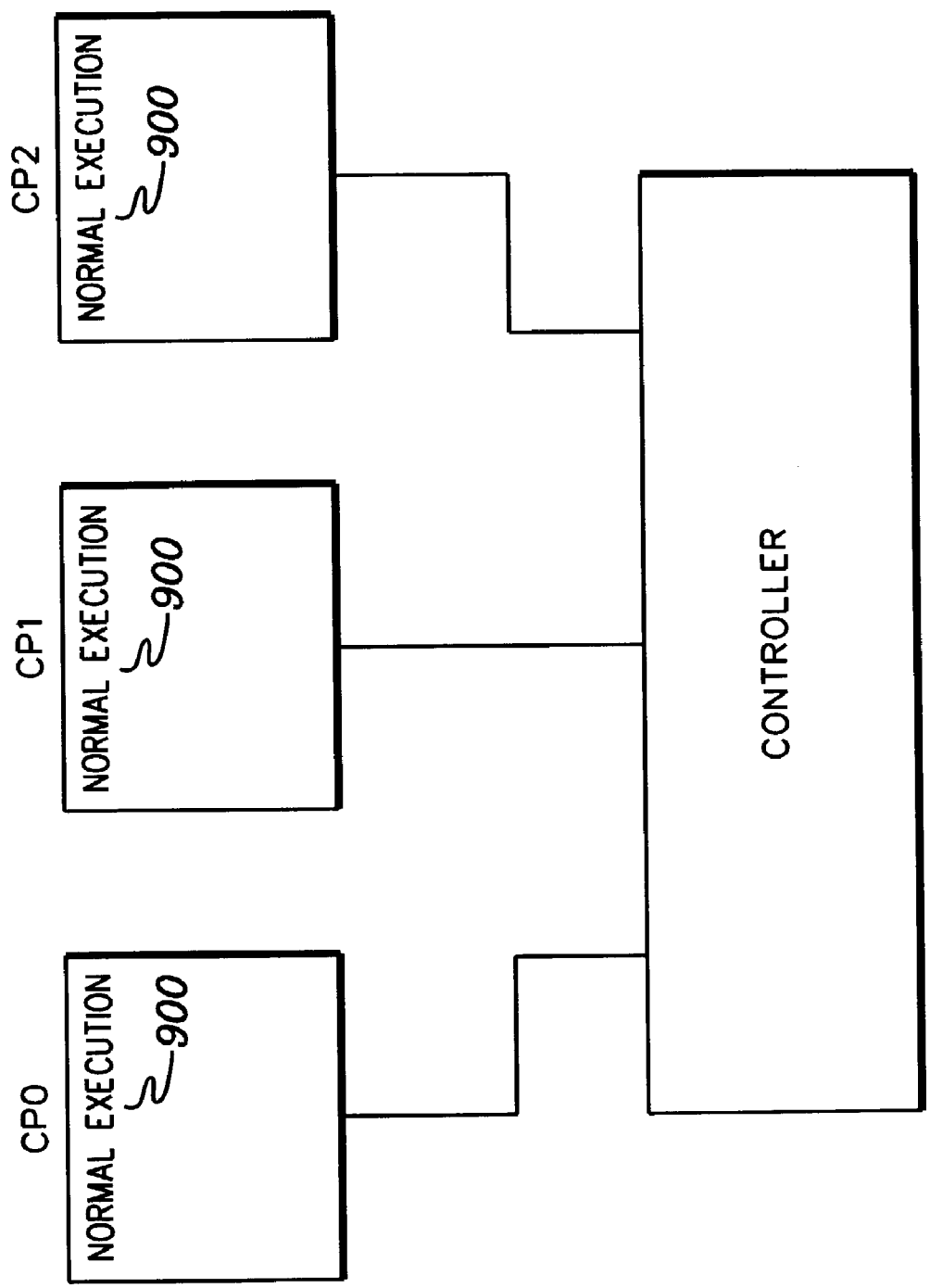
FIG. 9 pictorially depicts normal execution of the processors, since the quiesce has been released, in accordance with an aspect of the present invention.

Since the system is in a quiesce state, the master processor invalidates the appropriate page table entries in storage (800—FIG. 8). In one example, this includes turning on an invalid bit in one or more page table entries in storage. In response to the master processor completing the invalidation of the appropriate page table entries, it sends a signal to the controller indicating to release the quiesce (802). Meanwhile, CP0 and CP2 continue normal execution subject to the limitations (804).

In response to the controller receiving the release indication, the controller releases the quiesce, and CP0, CP1 and CP2 resume normal execution (900—FIG. 9) with no limitations. The blk_xlat signals that were previously active from the controller are no longer active.

Described in detail above is a capability that enables restrictions to be blocked (i.e., ignored) under certain conditions. This advantageously reduces the amount of quiesce stall time of processors and enhances system performance. This performance enhancement can be seen in many environments, including large SMP environments. For instance, one or more capabilities of the present invention improve on system performance, as follows. Previously for a 16-way SMP system, 10% of all time could be spent on quiescing the system and being stalled waiting for blk_xlat to drop. This performance degradation would increase at a rate roughly proportional to the square of the number of processors in an SMP system. This is significantly reduced by using one or more aspects of the present invention.

Although the above example is described with reference to an IPTE instruction, one or more aspects of the present invention are applicable to other instructions, including those that are similar or equivalent to the above instruction in the same architecture or different architectures. In one example, one or more aspects of the present invention are applicable to an IDTE instruction, which is described in a U.S. application entitled "Invalidating Storage, Clearing Buffer Entries, and An Instruction Therefor," Slegel et al., filed herewith, which is hereby incorporated herein by reference in its entirety.

Many variations to the above embodiment are possible without departing from the spirit of the present invention. For example, one or more aspects of the present invention are equally applicable to, for instance, virtual machine emulation, in which one or more pageable entities (e.g., guests) execute on one or more processors. As one example, pageable guests are defined by the Start Interpretive Execution (SIE) architecture, one example of which is described in an IBM® publication entitled, "IBM System/370 Extended Architecture," IBM Publication No. SA22-7095 (1985), which is hereby incorporated herein by reference in its entirety. In this example, both the host and guest are operating in a virtual addressing environment, and the translation tables (e.g., page and segment tables) for the guest are stored at virtual addresses in the host that are to be translated. That is, the page table entries themselves are virtual addresses that are to be translated to real addresses in the manner described herein. Thus, comparison of the page indices are performed, in one example, at each level of translation.

Although the above example is described with reference to SIE and the z/Architecture, one or more aspects of the present invention are equally applicable to other architectures and/or environments employing pageable entities or similar constructs.

In addition to the above variations, one or more aspects of the present invention are applicable to environments having mixed architecture modes. For example, in a logically partitioned environment, one physical processor can be executing code in one architecture mode, while another physical processor is executing code in another architecture mode. Additionally, one or more partitions can be executing pageable entities. A mixed architecture mode may alter the above processing, as indicated in the following table:

| Architecture Mode Of Master Processor | Architecture Mode Of Slave Processor | Action On Slave Processor |
| --- | --- | --- |
| ESA/390 | ESA/390 | No blocking |
| ESA/390 | z/Architecture | Blocking possible |
| z/Architecture | ESA/390 | No blocking |
| z/Architecture | z/Architecture | Blocking possible |

In the above table, when the action on the slave processor indicates no blocking, then the restriction is not ignored and the blk_xlat signal is honored. However, in those situations where it indicates that blocking is possible, then the restriction may be blocked, as determined in accordance with an aspect of the present invention.

The various modes of architecture described above are only examples. Other architecture modes and/or mixed architecture modes may be supported without departing from the spirit of the present invention.

Moreover, the various embodiments described above are just examples. There may be many variations to these embodiments without departing from the spirit of the present invention. For instance, although a logically partitioned environment is described herein, this is only one example. Aspects of the invention are beneficial to many types of environments, including other environments that have a plurality of zones, and non-partitioned environments. Further, there may be no central processor complexes, but yet, multiple processors coupled together. Yet further, one or more aspects of the invention are applicable to single processor environments.

Although a particular environment is described herein, again, many variations to this environment can be implemented without departing from the spirit of the present invention. For example, if the environment is logically partitioned, then more or less logical partitions may be included in the environment. Further, there may be multiple central processing complexes coupled together. These are only some of the variations that can be made without departing from the spirit of the present invention. Additionally, other variations are possible. For example, although the controller described herein serializes the instruction so that one broadcast instruction executes at one time, in another embodiment, multiple instructions may execute at one time. Further, the environment may include multiple controllers. Yet further, multiple quiesce requests (from one or more controllers) may be concurrently outstanding in the system. In that scenario, multiple page indices are saved and multiple comparisons are performed. Additional variations are also possible.

Advantageously, one or more aspects of the present invention can be used to increase performance, along with one or more aspects of one or more other inventions, which are described in a U.S. Patent Application, entitled "Filtering Processor Requests Based On Identifiers," Slegel et al., (IBM Docket No. POU920030047US1) filed herewith; and a U.S. Patent Application, entitled "Blocking Processing Restrictions Based On Addresses," Slegel et al. (IBM Docket No. POU920030049US1) filed herewith, each of which is hereby incorporated herein by reference in its entirety.

As used herein, the term "processing unit" includes pageable entities, such as guests; processors; emulators; and/or other similar components. Moreover, the term "by a processing unit" includes on behalf of a processing unit. The term "obtaining" includes, but is not limited to, receiving, having, being provided, receiving an indication of, etc. Yet further, the term "buffer" includes an area of storage, as well as different types of data structures, including, but not limited to, arrays. Further, although the term "table" is used herein, this term is to cover various other data structures. The terms, buffer and table, are not meant to be limiting to specific types of data structures.

The capabilities of the present invention can be implemented in software, firmware, hardware, or some combination thereof.

One or more aspects of the present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating processing of a computing environment, said method comprising:
   determining whether address translation is to continue despite a restriction prohibiting address translation; and
   continuing with processing, in response to the determining.

2. The method of claim 1, wherein the determining comprises comparing at least a portion of one page index with at least a portion of another page index, wherein a mismatch indicates continuing with processing.

3. The method of claim 2, wherein the one page index comprises a page index to be used in address translation.

4. The method of claim 2, wherein the address translation is performed by a processing unit, and wherein the another page index comprises a page index relating to a request obtained by the processing unit.

5. The method of claim 4, wherein the processing unit comprises a processor.

6. The method of claim 4, wherein the processing unit comprises a pageable entity.

7. The method of claim 4, wherein the request comprises a broadcast purge operation initiated in response to processing by another processing unit.

8. The method of claim 2, wherein the determining comprises comparing at least a portion of the one page index with at least a portion of a plurality of another page indices, wherein a plurality of mismatches indicates continuing with processing.

9. The method of claim 1, wherein the restriction comprises an indication prohibiting address translation in response to a buffer miss.

10. The method of claim 9, wherein the buffer is a translation lookaside buffer.

11. The method of claim 1, further comprising obtaining, by a processing unit that is to perform the address translation, an indication of the restriction, in response to a quiesce request.

12. The method of claim 11, wherein the quiesce request is in response to execution, by another processing unit of the computing environment, an instruction to invalidate a page entry.

13. The method of claim 12, wherein the processing unit and the another processing unit are based on different architecture modes.

14. The method of claim 12, wherein the processing unit and the another processing unit are based on the same architecture mode.

15. The method of claim 1, wherein the determining is performed by a pageable entity of the computing environment, and further comprising performing the determining in response to a translation of an address associated with the pageable entity itself.

16. A method of facilitating processing of a computing environment, said method comprising:
   Obtaining, by a processing unit of the computing environment, an indication to stall processing, in response to a processing restriction;
   Determining whether the processing restriction is to be blocked; and
   Continuing the processing, in response to the determining;
   Wherein the processing restriction comprises a prohibition of address translation, in response to a buffer miss.

17. The method of claim 16, wherein the determining comprises comparing at least a portion of one page index with at least a portion of another page index, wherein a mismatch indicates blocking of the restriction.

18. The method of claim 17, wherein the one page index comprises a page index to be used in address translation.

19. The method of claim 18, wherein the another page index comprises a page index relating to a request, an indication of which is obtained by the processing unit.

20. The method of claim 19, wherein the processing unit comprises a processor.

21. The method of claim 19, wherein the processing unit comprises a pageable entity.

22. A system of facilitating processing of a computing environment, said system comprising:
   means for determining whether address translation is to continue despite a restriction prohibiting the address translation; and
   means for continuing with processing, in response to the determining.

23. The system of claim 22, wherein the means for determining comprises means for comparing at least a portion of one page index with at least a portion of another page index, wherein a mismatch indicates continuing with processing.

24. The system of claim 23, wherein the one page index comprises a page index to be used in address translation.

25. The system of claim 23, wherein the address translation is performed by a processing unit, and wherein the another page index comprises a page index relating to a request obtained by the processing unit.

26. The system of claim 25, wherein the processing unit comprises a processor.

27. The system of claim 25, wherein the processing unit comprises a pageable entity.

28. The system of claim 25, wherein the request comprises a broadcast purge operation initiated in response to processing by another processing unit.

29. The system of claim 23, wherein the means for determining comprises means for comparing at least a portion of the one page index with at least a portion of a plurality of another page indices, wherein a plurality of mismatches indicates continuing with processing.

30. The system of claim 22, wherein the restriction comprises an indication prohibiting address translation in response to a buffer miss.

31. The system of claim 22, further comprising means for obtaining, by a processing unit that is to perform the address translation, an indication of the restriction, in response to a quiesce request.

32. The system of claim 31, wherein the quiesce request is in response to execution, by another processing unit of the computing environment, an instruction to invalidate a page entry.

33. The system of claim 32, wherein the processing unit and the another processing unit are based on different architecture modes.

34. The system of claim 32, wherein the processing unit and the another processing unit are based on the same architecture mode.

35. The system of claim 22, wherein a pageable entity of the computing environment comprises the means for determining, and wherein the determining is performed, in response to a translation of an address associated with the pageable entity itself.

36. A system of facilitating processing of a computing environment, said system comprising:
   Means for obtaining, by a processing unit of the computing environment, an indication to stall processing, in response to a processing restriction;
   Means for determining whether the processing restriction is to be blocked; and
   Means for continuing the processing, in response to the determining;
   Wherein the processing restriction comprises a prohibition of address translation, in response to a buffer miss.

37. The system of claim 36, wherein the means for determining comprises means for comparing at least a portion of one page index with at least a portion of another page index, wherein a mismatch indicates blocking of the restriction.

38. The system of claim 37, wherein the one page index comprises a page index to be used in address translation.

39. The system of claim 38, wherein the another page index comprises a page index relating to a request, an indication of which is obtained by the processing unit.

40. A system of facilitating processing of a computing environment, said system comprising:
   a processing unit to determine whether address translation is to continue despite a restriction prohibiting the address translation; and
   the processing unit to continue with processing, in response to the determining.

41. A method of facilitating processing of a computing environment, said method comprising:
   A processing unit of the computing environment to obtain an indication to stall processing, in response to a processing restriction;
   The processing unit to determine whether the processing restriction is to be blocked; and to continue the processing, in response to the determining;
   Wherein the processing restriction comprises a prohibition of address translation, in response to a buffer miss.

42. At least one program storage device readable by a machine embodying at least one program of instructions executable by the machine to perform a method of facilitating processing of a computing environment, said method comprising:
   determining whether address translation is to continue despite a restriction prohibiting the address translation; and
   continuing with processing, in response to the determining.

43. The at least one program storage device of claim 42, wherein the determining comprises comparing at least a portion of one page index with at least a portion of another page index, wherein a mismatch indicates continuing with processing.

44. The at least one program storage device of claim 42, wherein the one page index comprises a page index to be used in address translation.

45. The at least one program storage device of claim 43, wherein the address translation is performed by a processing unit, and wherein the another page index comprises a page index relating to a request obtained by the processing unit.

46. The at least one program storage device of claim 45, wherein the processing unit comprises a processor.

47. The at least one program storage device of claim 45, wherein the processing unit comprises a pageable entity.

48. The at least one program storage device of claim 45, wherein the request comprises a broadcast purge operation initiated in response to processing by another processing unit.

49. The at least one program storage device of claim 43, wherein the determining comprises comparing at least a portion of the one page index with at least a portion of a plurality of another page indices, wherein a plurality of mismatches indicates continuing with processing.

50. The at least one program storage device of claim 42, wherein the restriction comprises an indication prohibiting address translation in response to a buffer miss.

51. The at least one program storage device of claim 42, wherein said method further comprises obtaining, by a processing unit that is to perform the address translation, an indication of the restriction, in response to a quiesce request.

52. The at least one program storage device of claim 51, wherein the quiesce request is in response to execution, by another processing unit of the computing environment, an instruction to invalidate a page entry.

53. The at least one program storage device of claim 52, wherein the processing unit and the another processing unit are based on different architecture modes.

54. The at least one program storage device of claim 52, wherein the processing unit and the another processing unit are based on the same architecture mode.

55. The at least one program storage device of claim 42, wherein the determining is performed by a pageable entity of the computing environment, and wherein said method further comprises performing the determining in response to a translation of an address associated with the pageable entity itself.

56. At least one program storage device readable by machine embodying at least one program of instructions executable by the machine to perform a method of facilitating processing of a computing environment, said method comprising:

Obtaining, by a processing unit of the computing environment, an indication to stall processing, in response to a processing restriction;

Determining whether the processing restriction is to be blocked; and

Continuing the processing, in response to the determining;

Wherein the processing restriction comprises a prohibition of address translation, in response to a buffer miss.

57. The at least one program storage device of claim 56, wherein the determining comprises comparing at least a portion of one page index with at least a portion of another page index, wherein a mismatch indicates blocking of the restriction.

58. The at least one program storage device of claim 57, wherein the one page index comprises a page index to be used in address translation.

59. The at least one program storage device of claim 58, wherein the another page index comprises a page index relating to a request, an indication of which is obtained by the processing unit.

* * * * *

UNITED STATES PATENT AND TRADEMARK OFFICE
CERTIFICATE OF CORRECTION

PATENT NO. : 7,020,761 B2
APPLICATION NO. : 10/436209
DATED : March 28, 2006
INVENTOR(S) : Slegel et al.

It is certified that error appears in the above-identified patent and that said Letters Patent is hereby corrected as shown below:

Title page,
Item [12], delete "Siegel et al." and insert -- Slegel et al. --.
Item [75], Inventors, delete "Timothy J. Siegel, Staatsburg, NY (US);" and insert -- Timothy J. Slegel, Staatsburg, NY (US); --.

Column 10,
Line 26, insert -- the -- after "prohibiting".

Column 13,
Line 6, delete "42" after "claim" and insert -- 43 --.

Signed and Sealed this

Eleventh Day of July, 2006

JON W. DUDAS
*Director of the United States Patent and Trademark Office*